United States Patent
Guyomard et al.

(10) Patent No.: US 6,672,416 B1
(45) Date of Patent: Jan. 6, 2004

(54) DEVICE FOR FIXING A PIECE OF EQUIPMENT, IN PARTICULAR A HEAT EXCHANGER, ON A MOTOR VEHICLE STRUCTURAL ELEMENT

(75) Inventors: Jean-Nicolas Guyomard, Le Mesnil Fuguet (FR); Jacques Sigonneau, Theuvu Acheres (FR); Eric Cantineau, Paris (FR)

(73) Assignee: Valeo Thermique Moteur, La Verriere Cedex (FR)

( * ) Notice: Subject to any disclaimer, the term of this patent is extended or adjusted under 35 U.S.C. 154(b) by 0 days.

(21) Appl. No.: 09/555,415

(22) PCT Filed: Sep. 24, 1999

(86) PCT No.: PCT/FR99/02284
§ 371 (c)(1),
(2), (4) Date: May 25, 2000

(87) PCT Pub. No.: WO00/18604
PCT Pub. Date: Apr. 6, 2000

(30) Foreign Application Priority Data

Sep. 25, 1998 (FR) .......................................... 98 12029

(51) Int. Cl.⁷ .............................................. B60K 11/04
(52) U.S. Cl. ..................................... 180/68.4; 180/68.6
(58) Field of Search .............................. 180/68.4, 68.6; 296/194, 203.02

(56) References Cited

U.S. PATENT DOCUMENTS

| | | | | |
|---|---|---|---|---|
| 4,742,881 A | | 5/1988 | Kawaguchi et al. | |
| 5,205,349 A | * | 4/1993 | Nagao et al. | 180/68.4 |
| 5,441,100 A | * | 8/1995 | Ueda et al. | 180/68.4 |
| 5,558,310 A | * | 9/1996 | Ruruie et al. | 180/68.4 |
| 5,605,200 A | * | 2/1997 | Mayberry et al. | 180/68.4 |
| 5,657,817 A | * | 8/1997 | Heine et al. | 180/68.4 |
| 5,718,283 A | * | 2/1998 | Naty et al. | 180/68.6 |
| 5,785,140 A | * | 7/1998 | Suzuki et al. | 180/68.4 |

FOREIGN PATENT DOCUMENTS

| | | |
|---|---|---|
| DE | 43 37 038 | 6/1993 |
| EP | 0 331 540 | 9/1989 |

OTHER PUBLICATIONS

International Search Report dated Jan. 21, 2000.

* cited by examiner

Primary Examiner—Robert P. Olszewski
Assistant Examiner—Elaine Gort
(74) Attorney, Agent, or Firm—Morgan & Finnegan, LLP

(57) ABSTRACT

The invention concerns a device for fixing a piece of equipment for a motor vehicle, in particular a heat exchanger (20), on a structural element of the vehicle (10) such as a front surface module. The invention is characterised in that the device comprises at least two shoes (30) arranged on either side of the piece of equipment (20), while the structural element (10) comprises at least two substantially parallel internal edges (11a, 11b) defining an open part (15) wherein is mounted the piece of equipment (20). Each shoe is supported on one of the edges (11a, 11b) and on an external top surface (24) of the piece of equipment and made in a deformable material such that the piece of equipment (20) is force-mounted between the shoes (30).

12 Claims, 4 Drawing Sheets

DEVICE FOR FIXING A PIECE OF EQUIPMENT, IN PARTICULAR A HEAT EXCHANGER, ON A MOTOR VEHICLE STRUCTURAL ELEMENT

BACKGROUND OF THE INVENTION

The invention relates to the fixing of motor-vehicle equipment onto a structural element of this vehicle.

It relates in particular to the mounting of heat exchangers, for example the radiator of the circuit for cooling the engine, or the condenser of an air-conditioning loop of an installation for ventilation, heating and/or air conditioning of the passenger compartment of the vehicle, or the vent of a motor-driven fan unit of this installation.

It applies in particular, but not in a limiting way, to the mounting of these items of equipment on a facade of the vehicle (front face), particularly produced in the form of a modular unit provided with various items of equipment (cooling radiator, headlamps, etc.), prepared and delivered by the equipment manufacturer and advantageously ready to be mounted on the vehicle by the builder.

A heat exchanger of the abovementioned type can generally be fixed onto the structural element of the vehicle by means of metal springs provided in the upper area of the structural element, on the one hand, and of elastic damping studs in the lower part, on the other hand. The springs thus make it possible to take up the various dimensional tolerances and allow the mounting of different types of radiators by virtue of their flexibility. The abovementioned elastic studs, for their part, provide damping and centering on the structural element.

However, this mounting technique requires the fitting of attached elements (springs and fixing pins) implying additional cost relating to the supplementary components to be provided and to the time necessary to mount them in the assembly process.

One of the objects of the invention is to remedy this difficulty by proposing a novel mounting configuration making it possible to reduce the number of components necessary for assembly, to provide rapid mounting and to preserve sufficient flexibility to accept several different, types of equipment.

BRIEF SUMMARY OF THE INVENTION

The present invention is thus an improvement on the situation.

It relates to a device for fixing motor-vehicle equipment, especially a heat exchanger, onto a structural element of the vehicle including an open part in which the equipment is mounted.

According to the invention, the fixing device includes at least two shoes arranged on either side of the equipment while the structural element includes at least two substantially parallel inner rims delimiting the abovementioned open part. Each shoe bears on one of the rims, on the one hand, and on an outer prominent surface of the equipment, on the other hand. The shoes are produced from a deformable material so that the equipment is mounted by force between the shoes. Hence, the fixing of the equipment by means of deformable shoes makes it possible to damp the vibrations to which the equipment may be subject and to increase the limits of manufacturing tolerance of the equipment and of the structural element.

In order to facilitate the mounting of the equipment between the two rims of the structural element, at least one of the rims carries a supplementary bearing surface for at least one of the shoes, projecting in a plane substantially perpendicular to the surface of the rim. Hence, the equipment is mounted by pivoting about a ridge formed by the intersection of this bearing surface and the surface of the rim.

Advantageously, the structural element includes a housing for each shoe, comprising side walls projecting from the rims. Hence, each shoe is immobilized with respect to a direction substantially parallel to the rim.

According to another advantageous characteristic of the present invention, the shoes exhibit a substantially "U" shape, and the two legs of the "U", are in close contact with the equipment so as to hold it substantially fixed in a plane passing through the two rims.

In order to immobilize the equipment with respect to a direction parallel to the rim, the device according to the invention further includes means for clipping the equipment onto at least one lateral rim which the structural element includes, adjacent to the two rims.

In order to form the abovementioned clipping means, the equipment includes at least one inclined plane projecting from an outer side wall, this inclined plane being suitable for interacting with a substantially matching housing which the lateral rim of the abovementioned structural element includes.

Advantageously, the shoes are produced from a material with a high coefficient of friction, in particular in interaction with the abovementioned prominent wall of the equipment, this material especially being of the type comprising a rubber.

BRIEF DESCRIPTION OF THE DRAWING

Other advantages and characteristics of the present invention will emerge on examining the detailed description below and the attached drawings in which.

DETAILED DESCRIPTION OF THE INVENTION

The detailed description below and the attached drawings in essence contain elements of a certain character. They can not only serve to give a better understanding of the present invention but also contribute to its definition, as the case may be.

Figure 1:
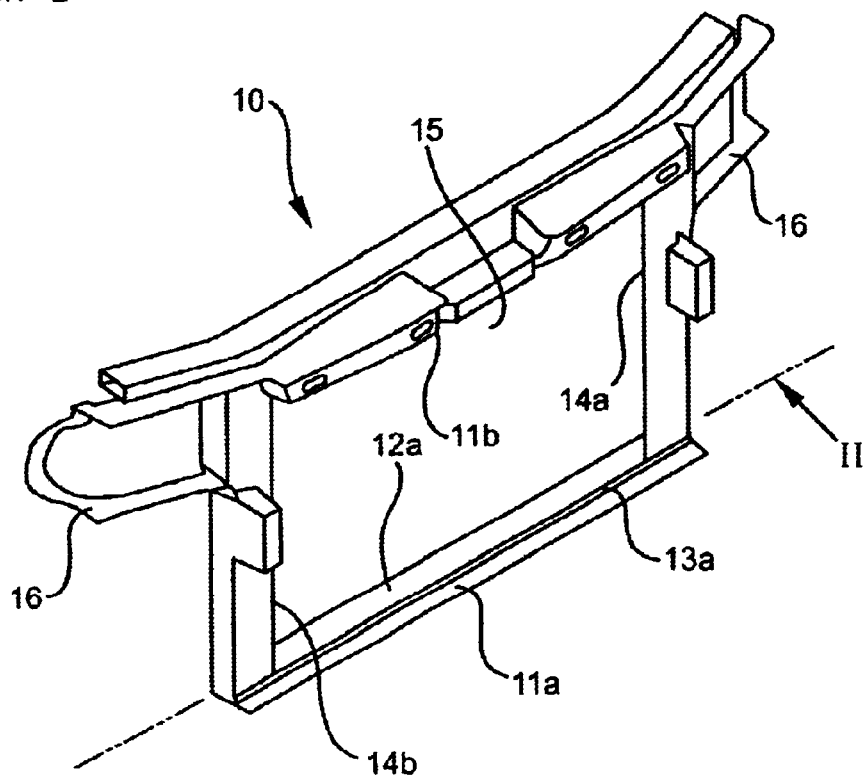
FIG. 1 represents a structural element including, in the example described, a front-face module of a motor vehicle.

Referring first of all to FIG. 1, a structural element is described including a front-face module 10 of a motor vehicle. This module includes an open frame 15 in which is intended to be mounted equipment of the vehicle comprising a radiator of a cooling circuit 20. The front-face module includes means (not represented) for fixing to the bodywork of the vehicle or else maybe [sic] integrated directly into the bodywork, for example by welding.

The front-face module 10 represented in FIG. 1 includes apertures in frames 16 for housing headlamps (lamps of the vehicle), in this example. It further includes an open frame 15 delimited horizontally by two substantially parallel rims 11a and 11b, and vertically by two side walls 14a and 14b, which are substantially parallel and adjacent to the rims 11a and 11b. Hence, the two rims and the two side walls form a substantially rectangular frame into which the equipment is intended to be inserted.

Figure 2:
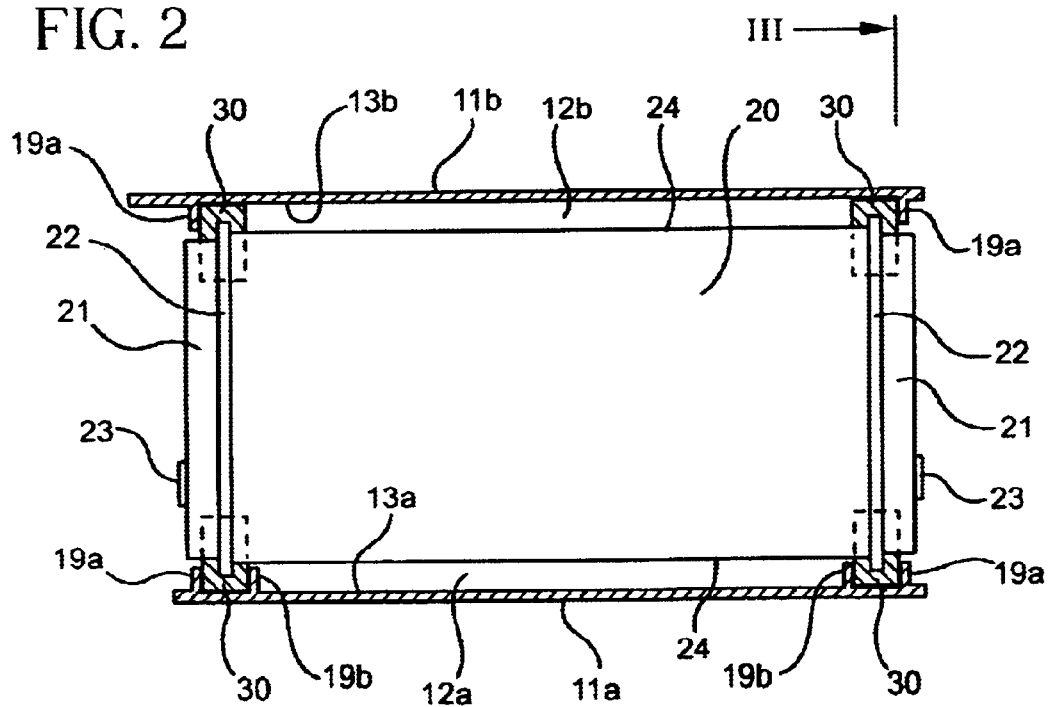
FIG. 2 diagrammatically represents a front view along the section II of FIG. 1 of the abovementioned equipment which, in the example described, includes a radiator of a circuit for cooling the engine of the vehicle.

In the example described, this equipment includes a radiator of a circuit for cooling the engine of the motor vehicle. Conventionally, this radiator is equipped with a bank of tubes joined together at each of their opposite ends by a manifold plate 22 (FIG. 2). Each of the two manifold plates 22 closes off a fluid chamber 21. In this example, the fluid which the two chambers 21 contain is water circulating in a cooling circuit. Referring to FIG. 2, this cooling radiator 20 is placed between the two rims 11a and 11b of the front-face module.

According to the invention, the fixing device includes shoes 30, produced from a deformable material (a rubber in the example described) and inserted between the radiator 20 and the rims 11a and 11b. In particular, these shoes 30 come to bear on a prominent outer surface 24 (FIG. 2) of the radiator 20, on the one hand, and on the rims 11a and 11b, on the other hand. In order to avoid the shoes sliding in a direction parallel to the rims 11a and 11b, lateral abutments 19a and 19b are provided, projecting from the rims 11a and 11b, in contact with the rubber shoes 30. It should be noted that, in a simplified variant of the fixing device, the lateral abutments 19b projecting from the lower rim 11a can be dispensed with.

Figure 3A:
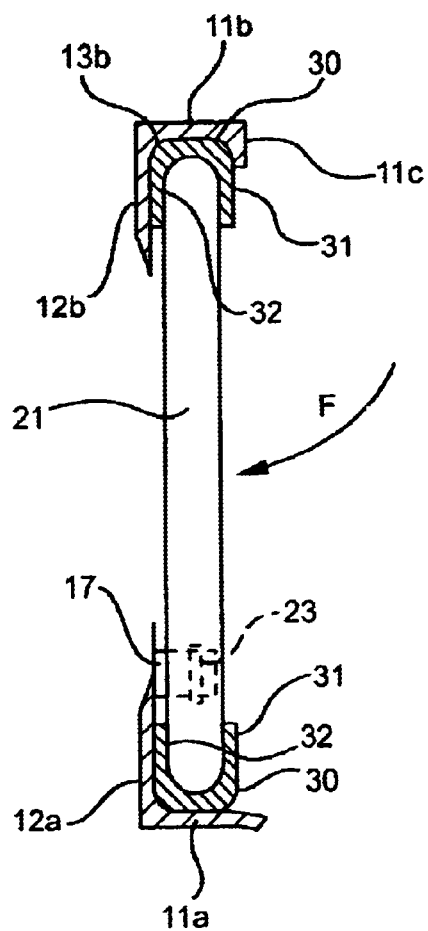
FIG. 3A diagrammatically represents a side view along the section III of FIG. 2, of the fixing device according to a preferred embodiment of the present invention.
Figure 3B:
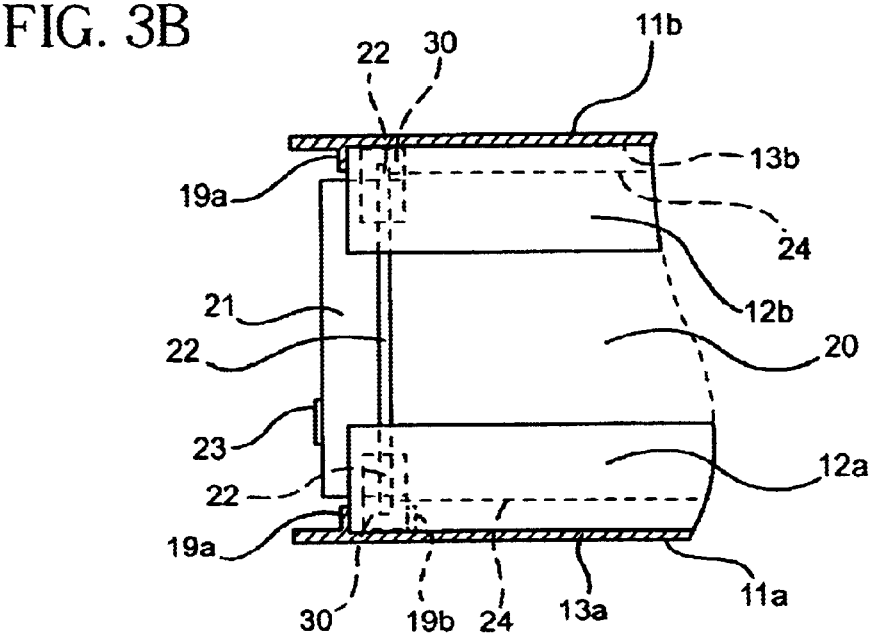
FIG. 3B represents a front view of the illustration shown in FIG. 3A.

Referring to FIGS. 3A and 3B, it is apparent that the four shoes which the fixing device A includes according to a preferred embodiment, of the invention exhibit a substantially "U" shape, A capping end parts of the water chambers 21 and of the prominent walls 24. Hence the two legs 31 and 32 of the "U" shaped shoes make it possible to immobilize the radiator 20 in the plane of the frame 15.

It should be noted here that the term "prominent walls" is to be taken in the wide sense. That being so, it encompasses the cheeks of the cooling radiator 20, as well as the extremities of the manifold plates 22 and of the water chambers 21. In this example, each shoe is mounted straddling one of the extremities of one of the manifold plates 22 (FIG. 2). The shoes then include central recesses matching the shape of the protuberances which the extremities of the manifold plates 22 form on the prominent surfaces 24, which makes it possible then to immobilize the heat exchanger 20 with respect to the shoes, in translation along the rims 11a, 11b. In a variant, provision may be made to add lateral abutments to the prominent surfaces 24 of the heat exchanger, and to insert the shoes between these abutments and the abutments 19a of the front-face module.

In order to mount the radiator 20 into the frame 15, provision is made:

to arrange two shoes on the upper surface of the radiator and on the lower surface, straddling the extremities of the manifold plates 22, then to insert the upper shoes into housings formed by the upper rim 11b, the lateral projection 12b and the lateral extension 11c of the upper rim (top of FIGS. 3A and 3B), and finally to make the radiator pivot (arrow F) about the ridge 13b formed by the intersection of the upper rim 11b and of the lateral projection 12b.

The lower shoes of the fixing device then come into abutment against the lateral projection 12a which the lower rim 11a includes (bottom of FIGS. 3A and 3B), thus forming bearing surfaces for the lower shoes.

Figure 4:
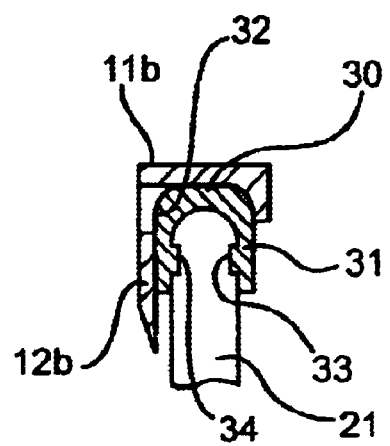
FIG. 4 diagrammatically represents a side view along the same section as FIG. 3, of a fixing device according to a variant of the abovementioned embodiment.

Referring now to FIG. 4, a variant of the embodiment of the shoes of the fixing device described above is described. In this variant, the legs of the "U" shaped shoes exhibit protuberances 33 and 34 in their inner surface, which are suitable for engaging in notches (closed recesses) provided on the water chambers 21. Hence, the cooling radiator can be shaped to interact with the fixing device according to the invention.

To that end, the present invention also envisages all the modifications made to the equipment and to the structural element, whenever they include shapes suitable for interacting with a fixing device according to the invention.

Figure 6:
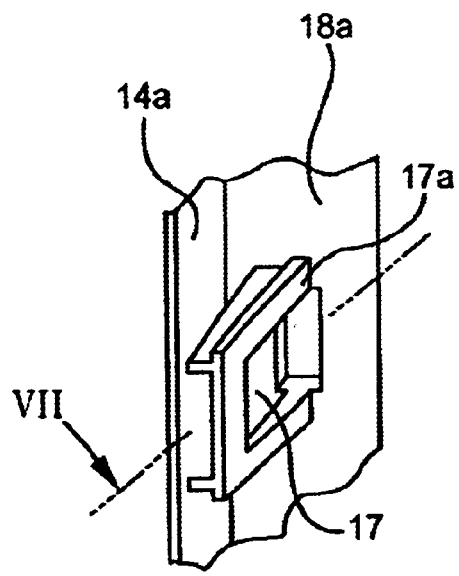
FIG. 6 represents a detailed view of a housing of the abovementioned inclined plane, mounted on a side wall of the structural element.
Figure 7:
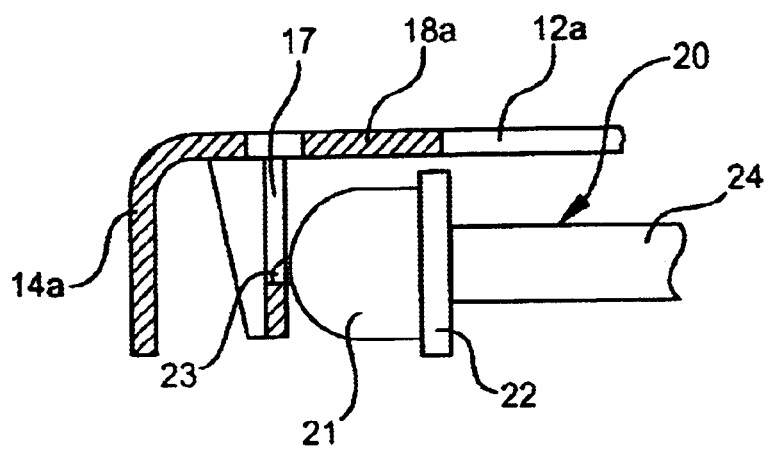
FIG. 7 diagrammatically represents a view along the section VII of FIG. 6, of the abovementioned clipping means.

Hence, referring to FIGS. 2 and 3A and 3B, in a lower part of the manifold chamber 21, a protuberance 23 is apparent including an inclined plane (FIG. 7). This protuberance added to the outer lateral surface of the chamber 21 interacts with a matching housing 17 (FIG. 6) included in a lug 17a issuing from the surface 18a adjacent to the side wall 14a of the front-face module, thus forming means for lateral clipping of the fixing device, while the surface 18a and the side wall 14a from the above-mentioned lateral rim. In particular, a protuberance 23 is provided on each water chamber 21 in such a way as laterally to fix the radiator 21 to the module.

Figure 5:
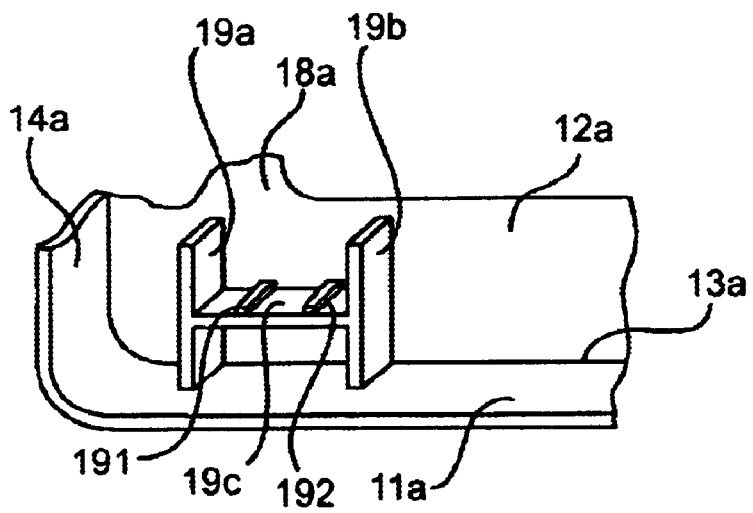
FIG. 5 represents a detailed view of a housing of one of the shoes of the fixing device according to the invention.

Referring now to FIG. 5, a housing is described which the rim 11a bears, for accommodating a shoe of the fixing device according to a further developed embodiment of the invention. This housing includes two side walls 19a and 19b forming lateral abutments of the shoe as well as a bearing surface 19c parallel to the rim 11a. Advantageously, this bearing surface 19c includes two chamfers 191 and 192 to facilitate the mounting of the shoe.

Hence, the fixing device according to the invention advantageously makes it possible to damp vibrations to which the equipment may be subject and to increase the limits of manufacturing tolerance of the equipment and of the structural element, the shoes which it contains being produced from a deformable material. Another advantage procured by the present invention consists in that the shoes are substantially identical and can produced in series by molding, or else by extrusion in a constant profile coming from a die, then cut to the desired length. Another advantage which the invention procures is related to the rapidity of the mounting (introduction of the shoes bearing against the walls 12b, 11b and 11c of FIGS. 3A and 3B, and pivoting movement F).

Obviously, the present invention is not limited to the embodiment described above by way of example. It extends to other variants.

Thus the abovementioned equipment may exhibit a heat exchanger other than a cooling radiator, for example a condenser of an air-conditioning loop of an installation for ventilation, heating and/or air conditioning of the passenger compartment of the vehicle.

The equipment may further include an element other than a heat exchanger, for example a vent of a motor-driven fan unit of this installation.

Moreover, the respective structures described above of the front-face module and of the fixing device may advantageously be adapted to the fixing of two items of equipment side by side, for example a cooling radiator followed by a condenser of an air-conditioning loop.

Moreover, the material from which the shoes are produced may be other than a rubber, for example a thermoplastic elastomer material matching the shape of the prominent walls 24 of the radiator 20.

The radiator 20 may be mounted otherwise, for example at 90° with respect to its configuration described in the example. In this case, the manifold chambers are horizontal, while the shoes are mounted on the side walls 14a and 14b of the front-face module.

The number of shoes provided may vary according to the requirements of the application of the device according to the invention. It is thus that, in a simplified embodiment of the device provision may be made for two shoes arranged on either side of the equipment.

Finally, the shape of the shoes may be other than a "U" shape. Provision may in fact be made for four "L"-shaped shoes, one leg of the "L" of two shoes on a diagonal bearing on one surface of the equipment, while the other surface of the equipment is in contact with the leg of two other shoes in the other diagonal of the frame 15.

What is claimed is:

1. A device for fixing motor-vehicle equipment into a structural element of the vehicle including an open part in which the equipment is mounted, comprising at least two shoes made from a deformable material and arranged on either side of the equipment, the structural element having at least two substantially parallel and horizontal inner rims delimiting the open part, further having at least two lateral abutments projecting from the rims, and wherein each shoe bears on one of the rims, and on an outer prominent surface of the equipment such that when the equipment is mounted by force between the shoes, the shoes are positioned completely flush against the rim and the outer prominent surface for immobilization of the equipment, wherein the shoes are further in contact with the lateral abutments and positioned completely flush with the lateral abutments in order to avoid the shoes sliding in a direction parallel to the rims, wherein the parallel inner rims and the lateral abutments are integral, wherein the shoes exhibit a substantially "U" shape having two legs that are in contact with the equipment so as to hold it substantially fixed in a plane passing through the two rims.

2. A device according to claim 1, wherein at least one of the rims carries a lateral projection for at least one of the shoes, projecting in a plane substantially perpendicular to the surface of the rim, in such a way that the equipment is mounted by pivoting substantially about a ridge formed by the intersection of the lateral projection and of the rim.

3. A device according to claim 2, wherein the structural element includes a housing for at least one of the shoes, comprising side walls projecting from a rim in order substantially to immobilize the shoe with respect to a direction substantially parallel to the rims.

4. A device according to claim 1, wherein the structural element includes a housing for at least one of the shoes, comprising side walls projecting from a rim in order substantially to immobilize the shoe with respect to a direction substantially parallel to the rims.

5. A device according to claim 1, comprising means for lateral clipping of the equipment onto at least one vertical lateral rim which the structural element includes, adjacent to the two horizontal inner rims, wherein the lateral clipping means includes a protuberance disposed on the equipment and a matching housing disposed on the vertical rim such that only one matching housing engages with the protuberance.

6. A device according to claim 5, wherein the protuberance further includes an inclined plane projecting from an outer side wall, and suitable for interacting with a substantially matching housing which the lateral rim of the structural element includes in order to form the clipping means.

7. A device according to claim 6, wherein the equipment includes a heat exchanger equipped with a bank of tubes joined together at each of their opposite ends by a manifold plate closed by a fluid chamber intended for thermal exchange.

8. A device according to claim 7, wherein the inclined plane is configured over a lateral part of at least one of the fluid chambers.

9. A device according to claim 8, wherein the shoes bearing on one of the inner rims are substantial identical.

10. A device according to claim 9, comprising four shoes, each mounted straddling one extremity of a manifold plate.

11. A device according to claim 1, wherein the shoes are produced from a material having a coefficient of friction substantially equal to that of rubber.

12. A device according to claim 1, wherein the structural element includes a front-face module-comprising two opposing frames having apertures for housing lamps of the vehicle.

* * * * *